(12) United States Patent
McWilliams et al.

(10) Patent No.: US 9,076,094 B2
(45) Date of Patent: Jul. 7, 2015

(54) SYSTEM AND METHOD FOR PROVIDING POWER TO A WIRELESS TAG

(71) Applicants: Thomas J. McWilliams, Bryn Mawr, PA (US); Edward F. Behm, Jr., Cherry Hill, NJ (US)

(72) Inventors: Thomas J. McWilliams, Bryn Mawr, PA (US); Edward F. Behm, Jr., Cherry Hill, NJ (US)

( * ) Notice: Subject to any disclaimer, the term of this patent is extended or adjusted under 35 U.S.C. 154(b) by 145 days.

(21) Appl. No.: 13/861,432

(22) Filed: Apr. 12, 2013

(65) Prior Publication Data

US 2013/0341410 A1    Dec. 26, 2013

Related U.S. Application Data

(60) Provisional application No. 61/623,161, filed on Apr. 12, 2012.

(51) Int. Cl.
*G06K 19/06* (2006.01)
*G06K 19/077* (2006.01)
*G06K 19/07* (2006.01)

(52) U.S. Cl.
CPC ...... *G06K 19/07749* (2013.01); *G06K 19/0708* (2013.01); *G06K 19/0704* (2013.01)

(58) Field of Classification Search
USPC ................. 235/492, 451, 380; 455/41.1, 41.2
See application file for complete search history.

(56) References Cited

U.S. PATENT DOCUMENTS

| 5,587,573 A * | 12/1996 | Owen et al. ................... 235/380 |
| 2010/0248653 A1* | 9/2010 | Merlin ......................... 455/90.1 |
| 2013/0175874 A1* | 7/2013 | Lou et al. ...................... 307/104 |
| 2013/0178154 A1* | 7/2013 | Zhu et al. ..................... 455/41.1 |
| 2014/0232516 A1* | 8/2014 | Stivoric et al. ................ 340/3.1 |

* cited by examiner

*Primary Examiner* — Ahshik Kim
(74) *Attorney, Agent, or Firm* — Barnes & Thornburg LLP; Thomas J. McWilliams; Edward F. Behm, Jr.

(57) ABSTRACT

The present invention provides an engine, system and method for providing an NFC tag capable of receiving a charge and performing as an active tag without interaction.

7 Claims, 6 Drawing Sheets

SYSTEM AND METHOD FOR PROVIDING POWER TO A WIRELESS TAG

CROSS-REFERENCE TO RELATED APPLICATIONS

The application claims priority to U.S. Provisional Application No. 61/623,161, filed Apr. 12, 2012, entitled System and Method for Providing Power to a Wireless Tag, the entirety of which is incorporated by reference herein.

FIELD OF THE INVENTION

The present invention relates to collecting power from a remote device and, more particularly, to a system and method for providing power to a wireless tag.

BACKGROUND

NFC (near field communication) is a wireless technology which allows for the transfer of data such as text or numbers between two NFC enabled devices. NFC tags, for example, stickers or wristbands, contain small microchips with little aerials which can store a small amount of information for transfer to another NFC device, such as a mobile device. Current NFC tag technology relies on external power sources to enable tag activity and does not provide for self-powered or rechargeable tags.

BRIEF DESCRIPTION OF THE DRAWINGS

The accompanying drawings are included to provide a further understanding of the disclosed embodiments. In the drawings.

SUMMARY OF THE INVENTION

The present invention provides an engine, system and method for providing an NFC tag capable of receiving a charge and performing as an active tag without interaction.

DETAILED DESCRIPTION

Informational tag systems and methods are disclosed that provide informational content, including but not limited to video, audio, and document content, and that may be self-powered or recharged over time. Described embodiments are intended to be exemplary and not limiting. As such, it is contemplated that the herein described systems and methods can be adapted to provide many types of tags with many types of data, and can be extended to provide enhancements and/or additions to the exemplary goods described. The invention is intended to include all such extensions. Reference will now be made in detail to various exemplary and illustrative embodiments of the present invention.

Figure 1:
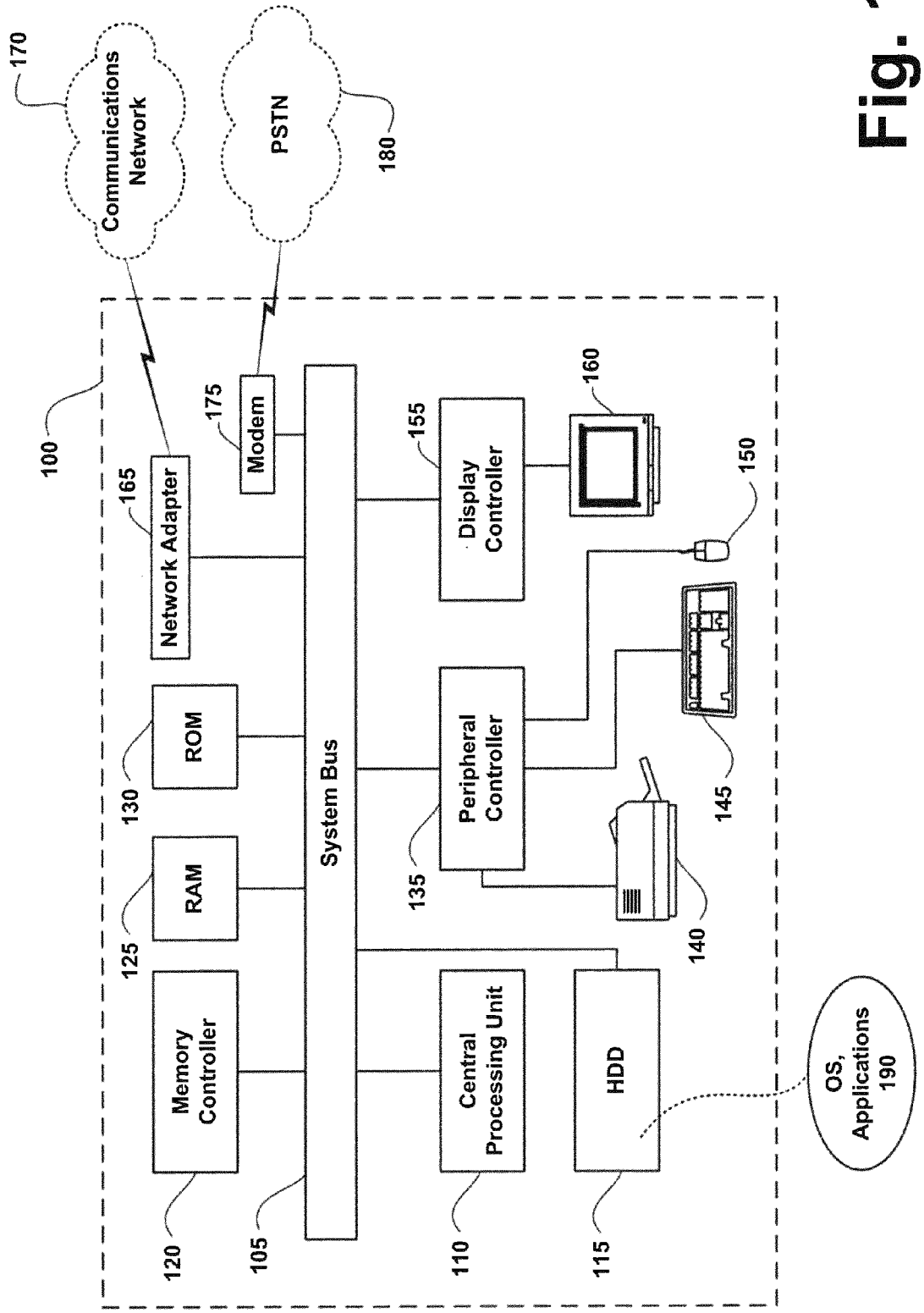
FIG. 1 is a block diagram of an exemplary computing system for use in accordance with herein described systems and methods.

FIG. 1 depicts an exemplary computing system 100 that can be used in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, mobile devices, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output generated by computing system 100. Such visual output may include text, graphics, animated graphics, and/or video, for example. Display 160 may be implemented with a CRT-based video display, an LCD-based display, gas plasma-based display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet, and hence which may provide or include tracking of and access to the domain data discussed herein. Communications network 170 may provide user access to computing system 100 with means of communicating and transferring software and information electronically, and may be coupled directly to computing system 100, or indirectly to computing system 100, such as via PSTN or cellular network 180. For example, users may communicate with computing system 100 using communication means such as email, direct data connection, virtual private network (VPN), Skype or other online video conferencing services, or the like. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
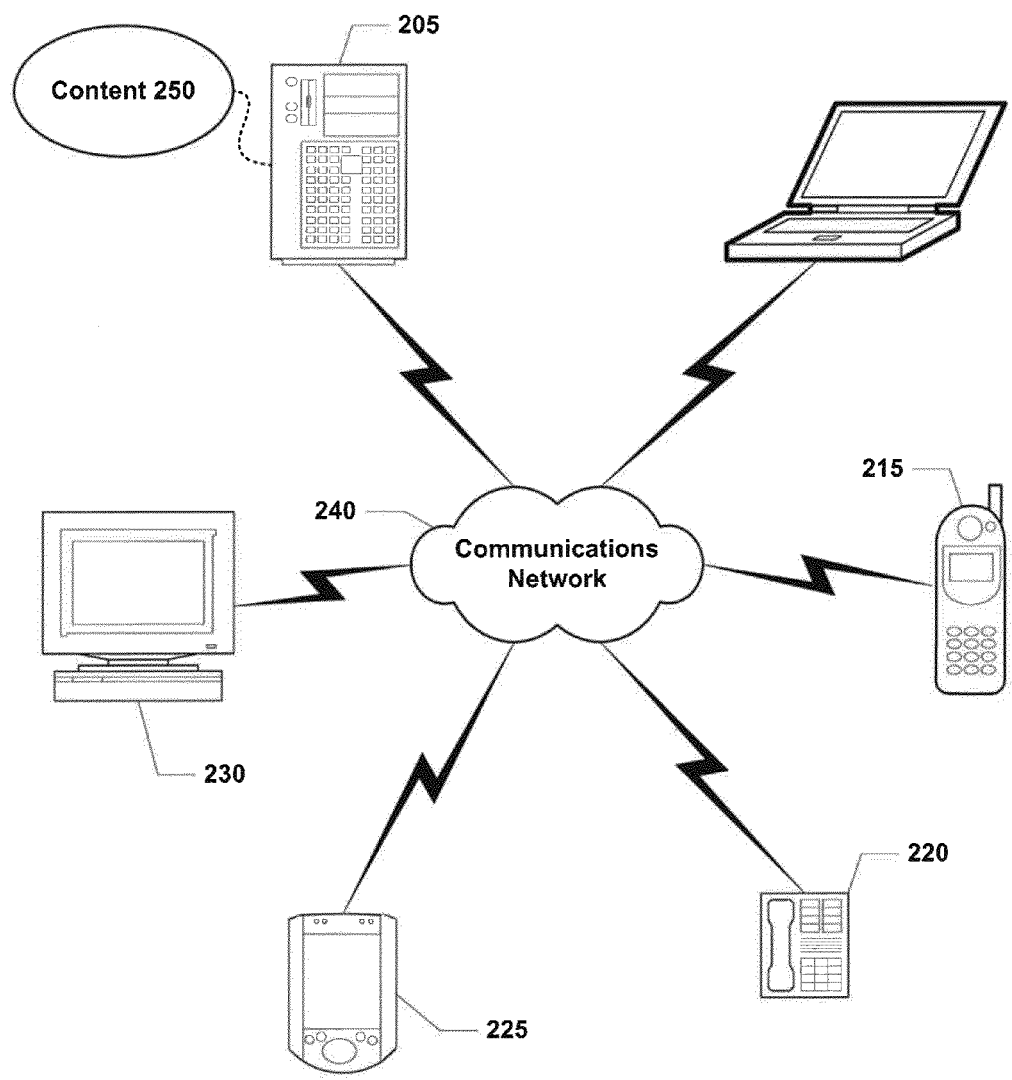
FIG. 2 is a block diagram showing an exemplary networked computing environment for use in accordance with herein described systems and methods.
Figure 3:
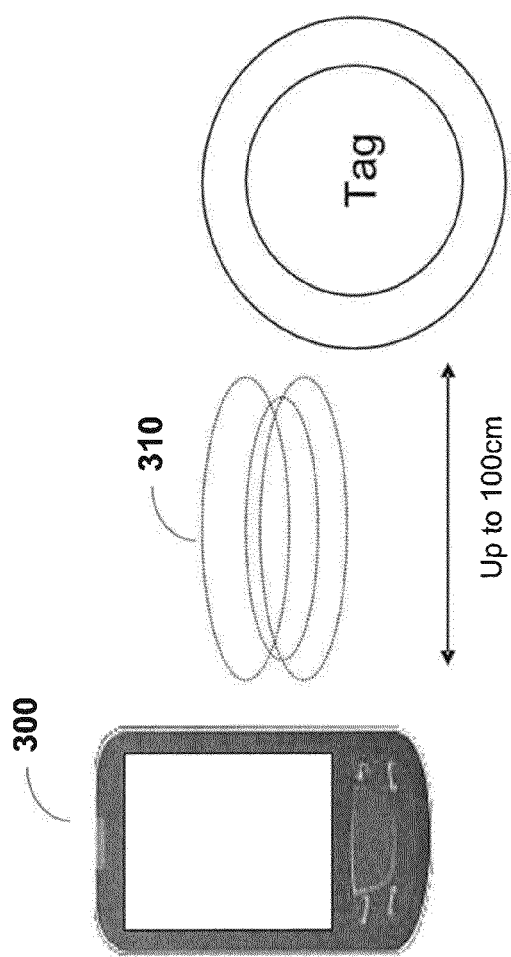
FIGS. 3-8 illustrate exemplary embodiments of the herein described systems and methods.
Figure 4:
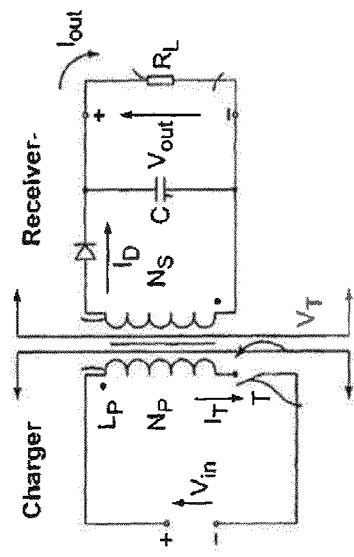
Figure 5:
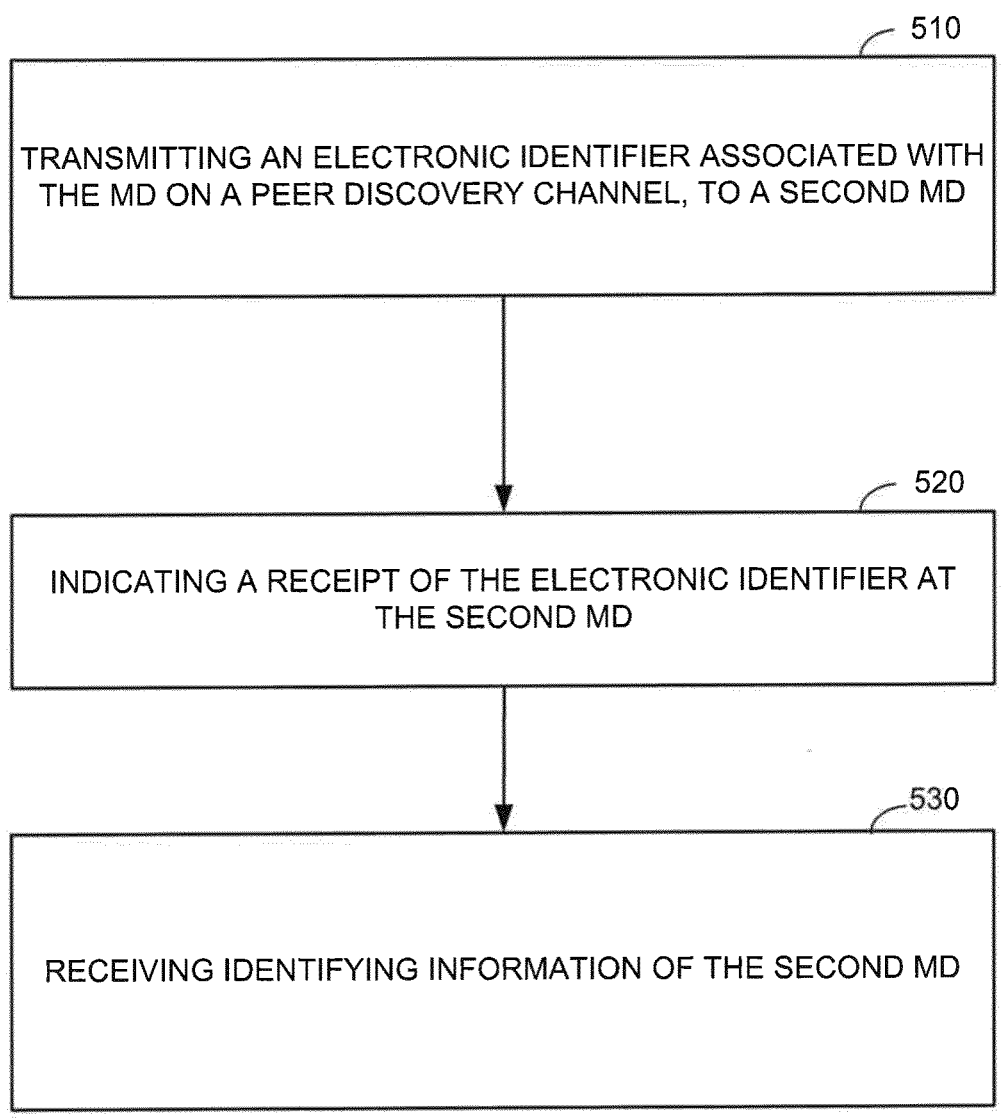
Figure 6:
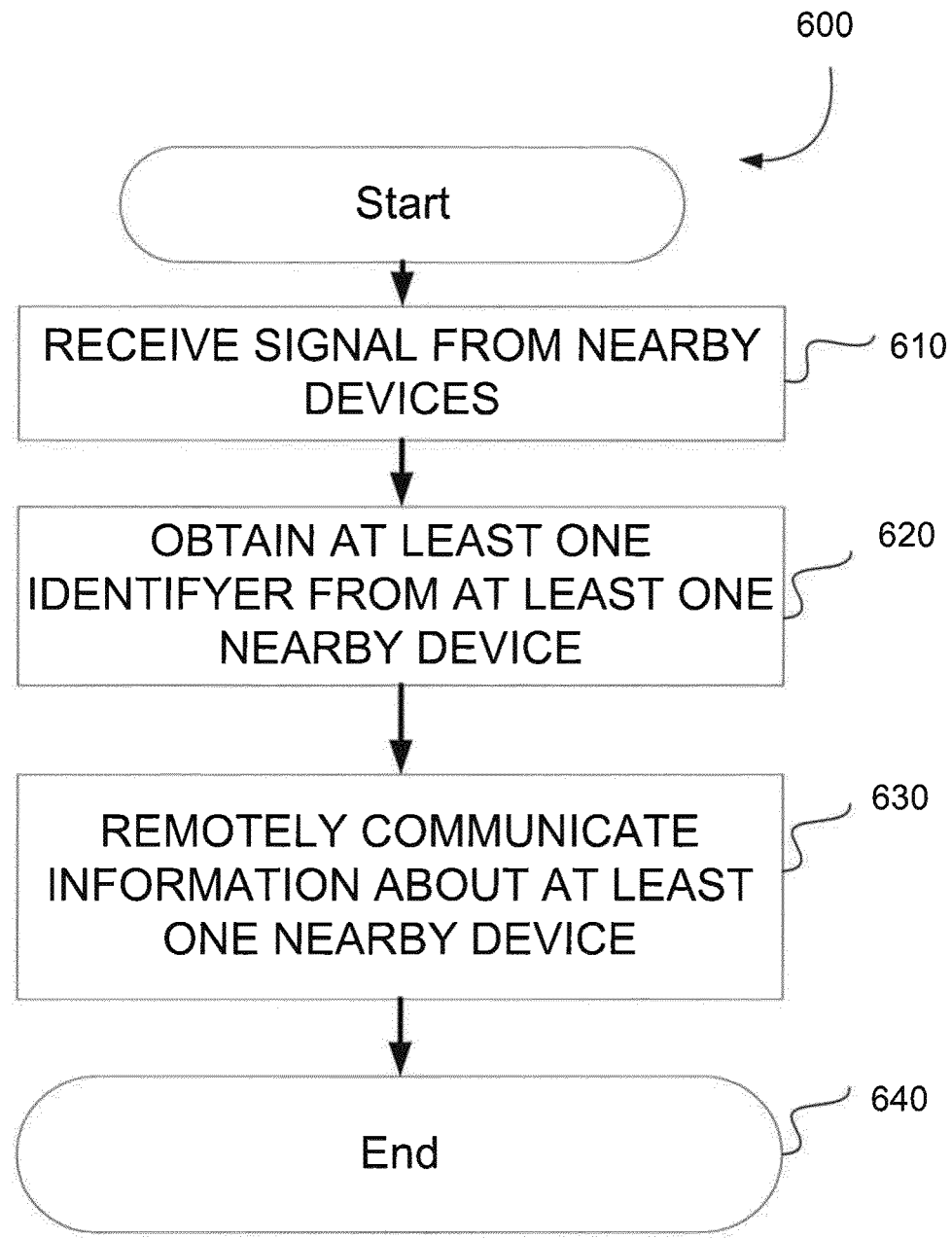
Figure 7:
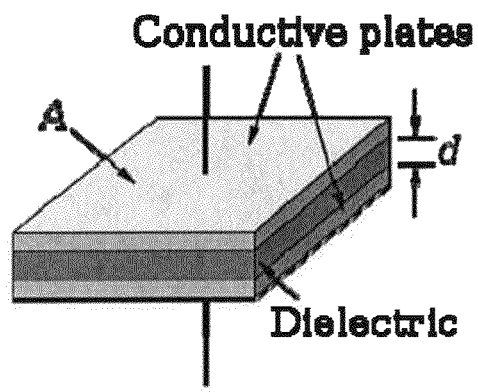

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or independently developed applications, the like, to interact with server 205.

The server 205 may thus deliver applications specifically designed for mobile client devices, such as, for example, client device 225. A client device 225 may be any mobile telephone, PDA, tablet or smart phone and may have any device compatible operating system. Such operating systems may include, for example, Symbian, RIM Blackberry OS, Android, Apple iOS, Windows Phone, Palm webOS, Maemo, bada, MeeGo, Brew OS, and Linux for smartphones and tablets. Although many mobile operating systems may be programmed in C++, some may be programmed in Java and .NET, for example. Some operating systems may or may not allow for the use of a proxy server and some may or may not have on-device encryption. Of course, because many of the aforementioned operating systems are proprietary, in prior art embodiments server 205 delivered to client device 225 only those applications and that content applicable to the operating system and platform communication relevant to that client device 225 type.

JavaScript Serialized Object Notation (JSON), a lightweight, text-based, language-independent data-interchange format, is based on a subset of the JavaScript Programming Language, Standard ECMA-262, 3.sup.rd Edition, dated December 1999. JSON syntax is a text format defined with a collection of name/value pairs and an ordered list of values. JSON is very useful for sending structured data over wire (e.g., the Internet) that is lightweight and easy to parse. It is language and platform independent, but uses conventions that are familiar to C-family programming conventions. The JSON language is thus compatible with a great many operating systems (a list of such systems is available at www.json.org).

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, and the like. For example, an OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, and the like. UTRA and E-UTRA are part of Universal Mobile Telecommunication System (UMTS). UTRA, E-UTRA, UMTS, as well as long term evolution (LTE) and other cellular techniques, are described in documents from an organization named "3rd Generation Partnership Project" (3GPP) and "3rd Generation Partnership Project 2" (3GPP2).

"WiFi" stands for "Wireless Fidelity." WiFi is typically deployed as a wireless local area network (WLAN) that may extend home and business networks to wireless medium. As referenced, the IEEE 802.11 standard defines WiFi communications as between devices, and as between devices and access points. WiFi typically provides aggregate user data speeds from 2 Mbps (for 802.11b) to approximately 150 Mbps (for 802.11n). Typical speeds for WiFi are around 15 Mbps, and latency (i.e., packet delay) averages around 10 ms with no load. WiFi may link devices, and/or devices and access points, over distances from a few feet to several miles. By way of contrast, LTE, as mentioned above, typically provides WAN connectivity that may stretch for much greater distances, but is typically not preferred for LAN communications. Of note, the techniques described herein may be used for the wireless networks and radio technologies mentioned above, as well as for other wireless networks and radio technologies.

WiFi networks, herein also referred to as IEEE 802.11 wireless networks, may operate in two modes: infrastructure mode and ad-hoc mode. In infrastructure mode, a device connects to an access point (AP) that serves as a hub for connecting wireless devices to the network infrastructure, including, for example, connecting wireless devices to Internet access. Infrastructure mode thus uses a client-server architecture to provide connectivity to the other wireless devices. In contrast to the client-server architecture of infrastructure mode, in ad-hoc mode wireless devices have direct connections to each other in a peer-to-peer architecture.

A capacitor is a passive two-terminal electrical component used to store energy in an electric field. The forms of practical capacitors vary widely, but all contain at least two electrical conductors separated by a dielectric (insulator); for example, one common construction consists of metal foils separated by a thin layer of insulating film. Capacitors are widely used as parts of electrical circuits in many common electrical devices.

When there is a potential difference (voltage) across the conductors, a static electric field develops across the dielectric, causing positive charge to collect on one plate and negative charge on the other plate. Energy is stored in the electrostatic field. An ideal capacitor is characterized by a single constant value, capacitance, measured in farads. This is the ratio of the electric charge on each conductor to the potential difference between them.

The capacitance is greatest when there is a narrow separation between large areas of conductor, hence capacitor conductors are often called "plates," referring to an early means of construction. In practice, the dielectric between the plates passes a small amount of leakage current and also has an electric field strength limit, resulting in a breakdown voltage, while the conductors and leads introduce an undesired inductance and resistance.

Capacitors are widely used in electronic circuits for blocking direct current while allowing alternating current to pass, in filter networks, for smoothing the output of power supplies, in the resonant circuits that tune radios to particular frequencies, in electric power transmission systems for stabilizing voltage and power flow, and for many other purposes.

Figure 8:
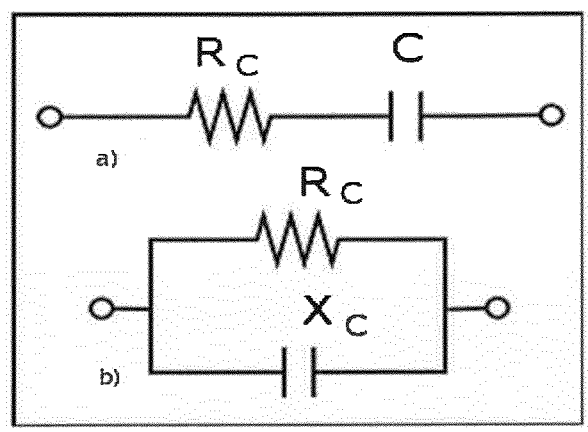

The simplest capacitor consists of two parallel conductive plates separated by a dielectric with permittivity e (such as air), as illustrated in FIG. 8. The model may also be used to make qualitative predictions for other device geometries. The plates are considered to extend uniformly over an area A and a charge density $\pm \rho = \pm Q/A$ exists on their surface. Assuming that the width of the plates is much greater than their separation d, the electric field near the centre of the device will be uniform with the magnitude $E = \rho/\varepsilon$. The voltage is defined as the line integral of the electric field between the plates $$V = \int_0^d E\, dz = \int_0^d \frac{\rho}{\varepsilon} dz = \frac{\rho d}{\varepsilon} = \frac{Qd}{\varepsilon A},$$

Solving this for C=Q/V reveals that capacitance increases with area and decreases with separation $$C = \frac{\varepsilon A}{d}$$

The capacitance is therefore greatest in devices made from materials with a high permittivity, large plate area, and small distance between plates. However solving for maximum energy storage using $U_d$ as the dielectric strength per distance and capacitor voltage at the capacitor's breakdown voltage limit $V = V_{bd} = U_d d$.

$$E = \frac{1}{2} CV^2 = \frac{1}{2} \frac{\varepsilon A}{d} (U_d d)^2 = \frac{1}{2} \varepsilon A d U_d^2$$

Thus, we see that the maximum energy is a function of dielectric volume, permittivity, and dielectric strength per distance. So increasing the plate area while decreasing the separation between the plates while maintaining the same volume has no change on the amount of energy the capacitor can store. Care must be taken when increasing the plate separation so that the above assumption of the distance between plates being much smaller than the area of the plates is still valid for these equations to be accurate.

Above a particular electric field, known as the dielectric strength $E_{ds}$, the dielectric in a capacitor becomes conductive. The voltage at which this occurs is called the breakdown voltage of the device, and is given by the product of the dielectric strength and the separation between the conductors, $$V_{bd} = E_{ds} d$$

The maximum energy that can be stored safely in a capacitor is limited by the breakdown voltage. Due to the scaling of capacitance and breakdown voltage with dielectric thickness, all capacitors made with a particular dielectric have approximately equal maximum energy density, to the extent that the dielectric dominates their volume.

For air dielectric capacitors the breakdown field strength is of the order 2 to 5 MV/m; for mica the breakdown is 100 to 300 MV/m, for oil 15 to 25 MV/m, and can be much less when other materials are used for the dielectric. The dielectric may be used in very thin layers and so absolute breakdown voltage of capacitors is limited. Typical ratings for capacitors used for general electronics applications range from a few volts to 1 kV. As the voltage increases, the dielectric must be thicker, making high-voltage capacitors larger per capacitance than those rated for lower voltages. The breakdown voltage is critically affected by factors such as the geometry of the capacitor conductive parts; sharp edges or points increase the electric field strength at that point and can lead to a local breakdown. Once this starts to happen, the breakdown quickly tracks through the dielectric until it reaches the opposite plate, leaving carbon behind causing a short circuit.

The usual breakdown route is that the field strength becomes large enough to pull electrons in the dielectric from their atoms thus causing conduction. Other scenarios are possible, such as impurities in the dielectric, and, if the dielectric is of a crystalline nature, imperfections in the crystal structure can result in an avalanche breakdown as seen in semi-conductor devices. Breakdown voltage is also affected by pressure, humidity and temperature.

An ideal capacitor only stores and releases electrical energy, without dissipating any. In reality, all capacitors have imperfections within the capacitor's material that create resistance, as illustrated in FIG. 9. This is specified as the equivalent series resistance or ESR of a component. This adds a real component to the impedance:

$$R_C = Z + R_{ESR} = \frac{1}{j\omega C} + R_{ESR}$$

As frequency approaches infinity, the capacitive impedance (or reactance) approaches zero and the ESR becomes significant. As the reactance becomes negligible, power dissipation approaches $P_{RMS} = V_{RMS}^2 / R_{ESR}$.

Similarly to ESR, the capacitor's leads add equivalent series inductance or ESL to the component. This is usually significant only at relatively high frequencies. As inductive reactance is positive and increases with frequency, above a certain frequency capacitance will be canceled by inductance. High-frequency engineering involves accounting for the inductance of all connections and components.

If the conductors are separated by a material with a small conductivity rather than a perfect dielectric, then a small leakage current flows directly between them. The capacitor therefore has a finite parallel resistance, and slowly discharges over time (time may vary greatly depending on the capacitor material and quality).

Ripple current is the AC component of an applied source (often a switched-mode power supply) (whose frequency may be constant or varying). Some types of capacitors, primarily tantalum and aluminium electrolytic capacitors, usually have a rating for maximum ripple current. Ripple current causes heat to be generated within the capacitor due to the current flow across the slightly resistive plates in the capacitor. The equivalent series resistance (ESR) is the amount of external series resistance one would add to a perfect capacitor to model this. ESR does not exactly equal the actual resistance of the plates.

Tantalum electrolytic capacitors are limited by ripple current and generally have the highest ESR ratings in the capacitor family. Exceeding their ripple limits tends to result in explosive failure. Aluminium electrolytic capacitors, the most common type of electrolytic, suffer a large shortening of life expectancy if rated ripple current is exceeded. Ceramic capacitors generally have no ripple current limitation and have some of the lowest ESR ratings.

The capacitance of certain capacitors decreases as the component ages. In ceramic capacitors, this is caused by degradation of the dielectric. The type of dielectric, ambient operating and storage temperatures are the most significant aging factors, while the operating voltage has a smaller effect. The aging process may be reversed by heating the component above the Curie point. Aging is fastest near the beginning of life of the component, and the device stabilizes over time. Electrolytic capacitors age as the electrolyte evaporates. In contrast with ceramic capacitors, this occurs towards the end of life of the component.

Temperature dependence of capacitance is usually expressed in parts per million (ppm) per ° C. It can usually be taken as a broadly linear function but can be noticeably non-linear at the temperature extremes. The temperature coefficient can be either positive or negative, sometimes even amongst different samples of the same type. In other words, the spread in the range of temperature coefficients can encompass zero. See the data sheet in the leakage current section above for an example.

Capacitors, especially ceramic capacitors, and older designs such as paper capacitors, can absorb sound waves resulting in a microphone effect. Vibration moves the plates, causing the capacitance to vary, in turn inducing AC current. Some dielectrics also generate piezoelectricity. The resulting interference is especially problematic in audio applications, potentially causing feedback or unintended recording. In the reverse microphonic effect, the varying electric field between the capacitor plates exerts a physical force, moving them as a speaker. This can generate audible sound, but drains energy and stresses the dielectric and the electrolyte, if any.

Current reversal occurs when the flow of current changes direction. Voltage reversal is the change of polarity in a circuit. Reversal is generally described as the percentage of the maximum rated voltage that reverses polarity. In DC circuits this will usually be less than 100%, (often in the range of 0 to 90%), whereas AC circuits experience 100% reversal.

In DC circuits and pulsed circuits, current and voltage reversal are affected by the damping of the system. Voltage reversal is encountered in RLC circuits that are under-damped. The current and voltage reverse direction, forming a harmonic oscillator between the inductance and capacitance. The current and voltage will tend to oscillate and may reverse direction several times, with each peak being lower than the previous, until the system reaches an equilibrium. This is often referred to as ringing. In comparison, critically damped or over-damped systems usually do not experience a voltage reversal. Reversal is also encountered in AC circuits, where the peak current will be equal in each direction.

For maximum life, capacitors usually need to be able to handle the maximum amount of reversal that a system will experience. An AC circuit will experience 100% voltage reversal, while under-damped DC circuits will experience less than 100%. Reversal creates excess electric fields in the dielectric, causes excess heating of both the dielectric and the conductors, and can dramatically shorten the life-expectancy of the capacitor. Reversal ratings will often affect the design considerations for the capacitor, from the choice of dielectric materials and voltage ratings to the types of internal connections used.

Leakage is equivalent to a resistor in parallel with the capacitor. Constant exposure to heat can cause dielectric breakdown and excessive leakage, a problem often seen in older vacuum tube circuits, particularly where oiled paper and foil capacitors were used. In many vacuum tube circuits, interstage coupling capacitors are used to conduct a varying signal from the plate of one tube to the grid circuit of the next stage. A leaky capacitor can cause the grid circuit voltage to be raised from its normal bias setting, causing excessive current or signal distortion in the downstream tube. In power amplifiers this can cause the plates to glow red, or current limiting resistors to overheat, even fail. Similar considerations apply to component fabricated solid-state (transistor) amplifiers, but owing to lower heat production and the use of modern polyester dielectric barriers this once-common problem has become relatively rare.

Electrolytic capacitors are conditioned when manufactured by applying a voltage sufficient to initiate the proper internal chemical state. This state is maintained by regular use of the equipment. If a system using electrolytic capacitors is disused for a long period of time it can lose its conditioning, and will generally fail with a short circuit when next operated, permanently damaging the capacitor. To prevent this in tube equipment, the voltage can be slowly brought up using a variable transformer (variac) on the mains, over a twenty or thirty minute interval. Transistor equipment is more problematic as such equipment may be sensitive to low voltage ("brownout") conditions, with excessive currents due to improper bias in some circuits.

Values available range from very low (picofarad range; while arbitrarily low values are in principle possible, stray (parasitic) capacitance in any circuit is the limiting factor) to about 5 kF supercapacitors.

Above approximately 1 microfarad electrolytic capacitors are usually used because of their small size and low cost compared with other technologies, unless their relatively poor stability, life and polarized nature make them unsuitable. Very high capacity supercapacitors use a porous carbon-based electrode material.

Most types of capacitor include a dielectric spacer, which increases their capacitance. These dielectrics are most often insulators. However, low capacitance devices are available with a vacuum between their plates, which allows extremely high voltage operation and low losses. Variable capacitors with their plates open to the atmosphere were commonly used in radio tuning circuits. Later designs use polymer foil dielectric between the moving and stationary plates, with no significant air space between them.

In order to maximize the charge that a capacitor can hold, the dielectric material needs to have as high a permittivity as possible, while also having as high a breakdown voltage as possible.

Several solid dielectrics are available, including paper, plastic, glass, mica and ceramic materials. Paper was used extensively in older devices and offers relatively high voltage performance. However, it is susceptible to water absorption, and has been largely replaced by plastic film capacitors. Plastics offer better stability and aging performance, which makes them useful in timer circuits, although they may be limited to low operating temperatures and frequencies. Ceramic capacitors are generally small, cheap and useful for high frequency applications, although their capacitance varies strongly with voltage and they age poorly. They are broadly categorized as class 1 dielectrics, which have predictable variation of capacitance with temperature or class 2 dielectrics, which can operate at higher voltage. Glass and mica capacitors are extremely reliable, stable and tolerant to high temperatures and voltages, but are too expensive for most mainstream applications. Electrolytic capacitors and supercapacitors are used to store small and larger amounts of energy, respectively, ceramic capacitors are often used in resonators, and parasitic capacitance occurs in circuits wherever the simple conductor-insulator-conductor structure is formed unintentionally by the configuration of the circuit layout.

Electrolytic capacitors use an aluminum or tantalum plate with an oxide dielectric layer. The second electrode is a liquid electrolyte, connected to the circuit by another foil plate. Electrolytic capacitors offer very high capacitance but suffer from poor tolerances, high instability, gradual loss of capacitance especially when subjected to heat, and high leakage current. Poor quality capacitors may leak electrolyte, which is harmful to printed circuit boards. The conductivity of the electrolyte drops at low temperatures, which increases equivalent series resistance. While widely used for power-supply conditioning, poor high-frequency characteristics make them unsuitable for many applications. Electrolytic capacitors will self-degrade if unused for a period (around a year), and when full power is applied may short circuit, permanently damaging the capacitor and usually blowing a fuse or causing arcing in rectifier tubes. They can be restored before use (and damage) by gradually applying the operating voltage, often done on antique vacuum tube equipment over a period of 30 minutes by using a variable transformer to supply AC power. Unfortunately, the use of this technique may be less satisfactory for some solid state equipment, which may be damaged by operation below its normal power range, requiring that the power supply first be isolated from the consuming circuits. Such remedies may not be applicable to modern high-frequency power supplies as these produce full output voltage even with reduced input.

Tantalum capacitors offer better frequency and temperature characteristics than aluminum, but higher dielectric absorption and leakage. Polymer capacitors (OS-CON, OC-CON) capacitors use solid conductive polymer (or polymerized organic semiconductor) as electrolyte and offer longer life and lower ESR at higher cost than standard electrolytic capacitors. A Feedthrough is a component that, while not serving as its main use, has capacitance and is used to conduct signals through a circuit board.

Several other types of capacitor are available for specialist applications. Supercapacitors store large amounts of energy. Supercapacitors made from carbon aerogel, carbon nanotubes, or highly porous electrode materials, offer extremely high capacitance (up to 5 kF) and can be used in some applications instead of rechargeable batteries. Alternating current capacitors are specifically designed to work on line (mains) voltage AC power circuits. They are commonly used in electric motor circuits and are often designed to handle large currents, so they tend to be physically large. They are usually ruggedly packaged, often in metal cases that can be easily grounded/earthed. They also are designed with direct current breakdown voltages of at least five times the maximum AC voltage.

The arrangement of plates and dielectric has many variations depending on the desired ratings of the capacitor. For small values of capacitance (microfarads and less), ceramic disks use metallic coatings, with wire leads bonded to the coating. Larger values can be made by multiple stacks of plates and disks. Larger value capacitors usually use a metal foil or metal film layer deposited on the surface of a dielectric film to make the plates, and a dielectric film of impregnated paper or plastic these are rolled up to save space. To reduce the series resistance and inductance for long plates, the plates and dielectric are staggered so that connection is made at the common edge of the rolled-up plates, not at the ends of the foil or metalized film strips that comprise the plates.

The assembly is encased to prevent moisture entering the dielectric early radio equipment used a cardboard tube sealed with wax. Modern paper or film dielectric capacitors are dipped in a hard thermoplastic. Large capacitors for high-voltage use may have the roll form compressed to fit into a rectangular metal case, with bolted terminals and bushings for connections. The dielectric in larger capacitors is often impregnated with a liquid to improve its properties.

Capacitors may have their connecting leads arranged in many configurations, for example axially or racially. "Axial" means that the leads are on a common axis, typically the axis of the capacitor's cylindrical body—the leads extend from opposite ends. Radial leads might more accurately be referred to as tandem; they are rarely actually aligned along radii of the body's circle, so the term is inexact, although universal. The leads (until bent) are usually in planes parallel to that of the flat body of the capacitor, and extend in the same direction; they are often parallel as manufactured.

Small, cheap discoidal ceramic capacitors have existed since the 1930s, and remain in widespread use. Since the 1980s, surface mount packages for capacitors have been widely used. These packages are extremely small and lack connecting leads, allowing them to be soldered directly onto the surface of printed circuit boards. Surface mount components avoid undesirable high-frequency effects due to the leads and simplify automated assembly, although manual handling is made difficult due to their small size.

Mechanically controlled variable capacitors allow the plate spacing to be adjusted, for example by rotating or sliding a set of movable plates into alignment with a set of stationary plates. Low cost variable capacitors squeeze together alternating layers of aluminum and plastic with a screw. Electrical control of capacitance is achievable with varactors (or varicaps), which are reverse-biased semiconductor diodes whose depletion region width varies with applied voltage. They are used in phase-locked loops, amongst other applications.

Inductive charging uses an electromagnetic field to transfer energy between two objects. This is usually done with a charging station. Energy is sent through inductive coupling to an electrical device, which then can use that energy to charge batteries.

Because there is a small gap between the two coils employed in each of the sender and receiver of the energy within the respective devices, inductive charging is considered a short-distance "wireless" energy transfer, despite the fact that there are typically more wires used with inductive charging than direct-contact charging, because it frees the user from having to deal with wires between the two devices.

Induction chargers typically use an induction coil to create an alternating electromagnetic field from within a charging base station, and a second induction coil in the portable device takes power from the electromagnetic field and converts it back into electrical current to charge the battery. The two induction coils in proximity combine to form an electrical transformer. Greater distances can be achieved when the inductive charging system uses resonant inductive coupling.

The present invention may allow for remote energy to transfer from a mobile device, such as a cell phone, to an RFID or NFC tag. Within each NFC tag, for example, may include at least one electrical inducer and at least one capacitor. The capacitor included within an NFC tag may be relatively matched to the shape of the tag. For example, a circular tag may have a relatively circular and low-profile capacitor. For example, the capacitor layer may be about 1 mm to about 2 mm thick.

The capacitor layer may be composed of known capacitor materials and or other materials which exhibit the appropriate properties and/or other materials which exhibit similar properties such as, for example, rare earth metals. The use of rare earth metals may, for example, allow for a very low profile and flexible circuit or capacitor which may be used in an NFC tag. As described and illustrated herein, a circuit may be left open where the tag is not used so as to allow for the charge to remain in the capacitor. The circuit may become closed and thus active, when activated through contact with an electromagnetic field similar similarly used with NFC communications. The circuit may be opened and closed via mechanisms known to those skilled in the art such as, for example, a Hall effect type gate.

The capacitor of the present invention may be pre-charged during manufacture and/or may receive a charge from any device for which an electronic field is received by the tag. For example, each interaction with a mobile device may allow for a charge to be received by the capacitor through the inducer mechanism included with the tag. Thus, the tag may recharge and or be charged depending on the power level of the capacitor when interacting with a charging device.

Similarly, a charged device may through the code embedded there in, automatically open and close the at least one gate to the capacitor so as to self regulate power consumption within its own circuit. Such soft power regulation may extend the power supply and or active mode life of the NFC tag.

In an embodiment of the present invention, a tag having at least one power source may further include visual aids that may allow the tag to be visually noticed by a passerby. For example, an LED light source may be included with the tag and may be activated by an active tag at some predetermined interval to attract interaction with at least one user device. In this way, an active tag may alert and otherwise unaware potential user of the tags existence and may extract a charge from that user where otherwise it would not be in range of the user such that a charge would be affected to the inducer of the tag. In an embodiment of the present invention, an active tag may periodically send out at least one signal to alert in range devices of its existence. Again, such a feature may allow a user of a mobile device to become aware of a proximate tag for which an interaction can occur.

Such active and/or remote charging tags may be used for many other purposes including for example, providing and or delivering unsolicited information and/or data to a proximate device(s). In this way, a tag may interact with the user device in an affirmative interaction with the user device. Such interaction may, for example, allow for the tracking of a user devices movement through and around tags.

Such tracking maybe useful in a retail setting. For example, small active tags may be place throughout a large hardware store, and may track users moving through the store. This tracking through the store may allow the store to better understand what products and or areas each customer entering the store may have an interest in. By way of further example, a user maybe identified upon entering the store after passing through an identification system at the entrance. Once identified, the active tag may record when the user is proximate to the tag. For example, a customer may enter the retail establishment and may be recorded as viewing many materials in the plumbing department. However, the customer may exit the retail establishment after purchasing some duct tape, for example. Thus, without the tag information, the retailer may assume that the customer was only interested in duct tape. This type of information may allow the retailer to better understand customer habits, for example. Similarly, and as would be appreciated by those skilled in the art, directed advertising may be born upon the customer as his or her habits are better-known.

For example, that same customer upon entering the store several days later maybe at five as someone interested in plumbing supplies. After passing to the entrance a central server within the store maybe notified that that particular customer has enter the store. After comparison to a database which stored the identification and viewing habits as tracked by the active tags, a signal maybe then sent to provide to the incoming customer information about plumbing. Such a signal may include, for example, an audio prompt to the greeter at the entrance so as to alert the incoming customer that there is a sale in the plumbing department. Alternatively, a prompt may be also sent to a television or monitor if you have becoming customers which may switch to an advertisement for plumbing supplies, for example. Similarly, a text maybe sent to all mobile devices within the store to alert customers to a sale in plumbing.

Those of skill in the art will appreciate that the herein described systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

We claim:
1. An NFC tag, comprising:
   at least one antenna; a transceiver communicatively coupled to the at least one antenna;
   at least one inducer; and
   a capacitor layer comprising at least one capacitor communicatively coupled to said at least one inducer; wherein a gate separates the at least one capacitor from the at least inducer and wherein the at least one capacitor is capable of receiving a charge through the at least inducer;
   wherein the capacitor layer is about 1 mm to about 2 mm thick.
2. The NFC tag of claim 1, wherein the gate is closed.

3. The NFC tag of claim 1, wherein the inducer receives an electric charge from at least one external source.

4. The NFC tag of claim 1, wherein transceiver receives a charge from the inducer.

5. The NEC tag of claim 1, wherein the gate is operable via Hall effect.

6. The NEC tag of claim 1, further comprising at least one LED.

7. The NEC tag of claim 1, further comprising at least one LED indicative of the charge of the capacitor.

* * * * *